(12) United States Patent
Kirtane et al.

(10) Patent No.: US 8,694,920 B2
(45) Date of Patent: Apr. 8, 2014

(54) DISPLAYING APPLICATION INFORMATION IN AN APPLICATION-SWITCHING USER INTERFACE

(75) Inventors: Latika Kirtane, Seattle, WA (US); Chaitanya D. Sareen, Seattle, WA (US); Bret P. Anderson, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1062 days.

(21) Appl. No.: 12/237,414

(22) Filed: Sep. 25, 2008

(65) Prior Publication Data

US 2010/0077347 A1 Mar. 25, 2010

(51) Int. Cl.
*G06F 3/0481* (2013.01)

(52) U.S. Cl.
CPC .................................. *G06F 3/04817* (2013.01)
USPC ............................ 715/846; 715/779; 715/803

(58) Field of Classification Search
CPC ........................... G06F 3/04817; G06F 3/0481
USPC .................................................. 715/779, 846
See application file for complete search history.

(56) References Cited

U.S. PATENT DOCUMENTS

| 5,333,256 | A | | 7/1994 | Green et al. | |
|---|---|---|---|---|---|
| 5,617,526 | A | * | 4/1997 | Oran et al. | 715/779 |
| 6,414,697 | B1 | | 7/2002 | Amro et al. | |
| 6,944,647 | B2 | * | 9/2005 | Shah et al. | 709/206 |
| 7,581,192 | B2 | * | 8/2009 | Stabb et al. | 715/781 |
| 7,614,010 | B2 | * | 11/2009 | Hosoki et al. | 715/783 |
| 7,631,270 | B2 | * | 12/2009 | Cunningham et al. | 715/772 |
| 7,793,226 | B2 | * | 9/2010 | Sorenson et al. | 715/777 |
| 7,882,448 | B2 | * | 2/2011 | Haug | 715/779 |
| 8,140,993 | B2 | * | 3/2012 | Balasubramanian | 715/779 |
| 2003/0132949 | A1 | | 7/2003 | Fallon et al. | |
| 2006/0200773 | A1 | * | 9/2006 | Nocera et al. | 715/764 |
| 2007/0067734 | A1 | | 3/2007 | Cunningham et al. | |
| 2007/0143710 | A1 | * | 6/2007 | Hayman | 715/837 |
| 2007/0214429 | A1 | * | 9/2007 | Lyudovyk et al. | 715/772 |
| 2008/0046832 | A1 | | 2/2008 | Balasubramanian | |
| 2009/0007017 | A1 | * | 1/2009 | Anzures et al. | 715/835 |

OTHER PUBLICATIONS

IBM Technical Disclosure Bulletin, "Icon Overlays to Present Status Information," Jun. 1, 1994, IBM, TDB-ACC-No. NA9406461, vol. 37, Issue 6A.*

DiLascia, "System Tray Balloon Tips and Freeing Resources Quickly in .NET," Nov. 2002, Available http://msdn.microsoft.com/en-us/magazine/cc188923.aspx.*

(Continued)

*Primary Examiner* — Alvin Tan
(74) *Attorney, Agent, or Firm* — Carole Boelitz; Leonard Smith; Micky Minhas

(57) ABSTRACT

An application status system is described herein that informs the user about application-specific status updates and notifications through a changing status icon associated with an application-switching user interface displayed by an operating system when the application is running. When an application has focus, there is typically no way for another application to display status to the user without displaying a dialog box or a notification balloon that interrupts the user. The application status system takes advantage of the existing application-switching user interface to display a lightweight status icon overlay on the application-switching user interface itself. Thus, the application status system allows applications to provide application-specific status updates without interrupting a user's activity in another application and without adding additional UI for a user to process.

16 Claims, 5 Drawing Sheets

(56) References Cited

OTHER PUBLICATIONS

"Notification Area", Retrived at <<http://msdn.microsoft.com/en-us/library/aa511448(printer).aspx>>, Aug. 4, 2008. pp. 1-10.

"Notifu, a free open source pop-up balloon utility", Retrieved at <<http://www.paralint.com/projects/notifu/>>, May 5, 2005. pp. 3.

"TortoiseSVN the coolest Interface to (Sub)Version Control", Retrieved at <<http://tortoisesvn.net/node/138>>, Aug. 1, 2008. pp. 1-2.

* cited by examiner

DISPLAYING APPLICATION INFORMATION IN AN APPLICATION-SWITCHING USER INTERFACE

BACKGROUND

Users of computers today run many applications at the same time. For example, a user may be actively working in a word processing application, while also viewing related information in a spreadsheet application, listening to music through a media player application, staying in touch with others through an email application and an instant messaging application, and so forth. Many of these applications have a changing status over time for which the applications alert the user. For example, an instant message application may alert a user each time one of the user's contacts signs on. As another example, an email application may alert a user each time the application receives a new email message.

Software applications have various ways of alerting a user to events and status changes. For example, applications may display a dialog box, make a beeping sound, or use operating system provided facilities such as a system tray area for displaying icons, displaying a balloon notification, or flashing the application window. Each of these ways of alerting a user seeks to get the user's attention and notify the user that something has happened that may make the user want to transition from whatever activity the user is currently working on to address the event that caused the alert. Application developers design these events to be disruptive and the events may actually begin to annoy or distract the user and affect the user's productivity.

One problem with notifying the user in this way is that applications can overload the user with the quantity and variety of notifications that the user receives. For example, a user may have a large number of status icons in his/her system tray, receive several dialog boxes per hour, and so forth. The quantity of application notifications may lead the user to ignore the notifications, run fewer applications, or become less productive as the user spends more time staying aware of various applications' status and less time performing productive tasks. Another problem is that the user does not know where to focus to get information about the application, because the user may receive information in so many places. For example, an application may have status information in the application UI, in the system tray, on the desktop (such as through a separate dialog box window), and on the taskbar.

SUMMARY

An application status system is described herein that informs the user about application-specific status updates and notifications through a changing status icon associated with an application-switching user interface displayed by an operating system when the application is running. Most operating systems provide an application-switching user interface (UI), such as a taskbar, which allows users to switch between running applications. When an application has focus (e.g., is actively being used by the user), there is typically no way for another application to display status to the user without displaying a dialog box or a notification balloon that interrupts the user. The application status system takes advantage of the existing application-switching user interface to display a lightweight status icon overlay on the application-switching user interface itself. Thus, the application status system allows applications to provide application-specific status updates without interrupting a user's activity in another application and without adding additional UI for a user to process.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
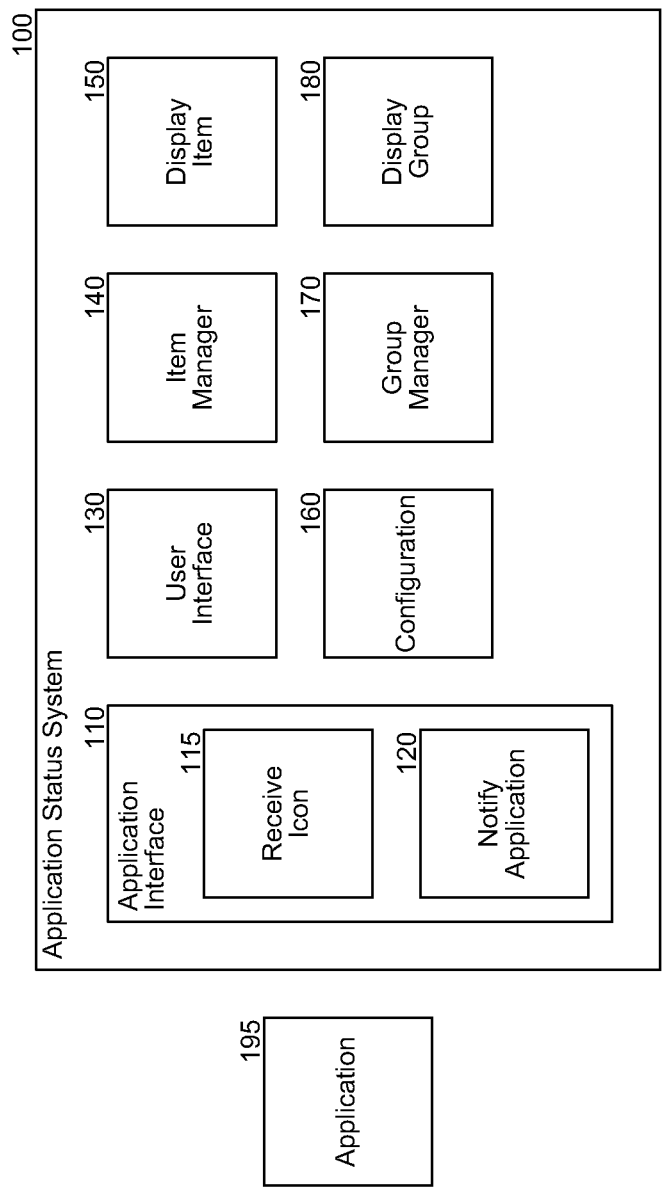
FIG. 1 is a block diagram that illustrates components of the application status system, in one embodiment.

An application status system is described herein that informs the user about application-specific status updates and notifications through a changing status icon associated with an application-switching user interface (e.g., a taskbar) displayed by an operating system when the application is running. The application status system provides the user with status information without interrupting the user with dialog boxes or otherwise being excessively intrusive. Most operating systems provide an application-switching user interface (UI), such as a taskbar, which allows users to switch between running applications. When an application has focus (e.g., is actively being used by the user), there is typically no way for another application to display status to the user without displaying a dialog box or a notification balloon that interrupts the user. The application status system takes advantage of the existing application-switching user interface to display a lightweight status icon overlay on the application-switching user interface itself (e.g., a 16×16 icon overlay on the taskbar button for the application). For example, an email application that receives a new email message can change the status icon to notify the user that a new message has arrived. As another example, if a user sets his/her messaging status to busy in an instant messaging application, the application can display the busy status using the status icon. Thus, the application status system allows applications to provide application-specific status updates without interrupting a user's activity in another application and without adding additional UI for a user to process.

In some embodiments, the application status system provides an overlay application programming interface (API) that applications can call to set a status icon (e.g., a 16×16 overlay) for the system to display (e.g., in the bottom right-hand corner of the application's taskbar button). For example, Microsoft Windows provides an ITaskBarList3 interface to which the system can add a new API to allow an application to specify a status icon for a given window. When the taskbar renders a taskbar button, if an icon is associated with the taskbar button, then the taskbar draws the icon overlay on top of the usual application icon on the taskbar button. Following is an example API prototype for setting an application's overlay icon:

ITaskbarList3::SetoverlayIcon (HWND hwnd, HICON hicon)

The application status system displays the status icon overlay in a taskbar button when a caller invokes the SetOverlayIcon API with the taskbar button's window handle (e.g., HWND). An application may have multiple windows that have associated taskbar buttons, and the window parameter handle allows the caller to specify which of the multiple windows on which to display the received status icon. The caller also provides a handle to a loaded icon (e.g., HICON). The icon can come from a resource file associated with the application or another other storage location for icons. If the window handle passed by the caller has a corresponding taskbar button/group, then the system shows the overlay. If the caller passes a NULL icon handle, then the system clears the status icon associated with the calling application.

FIG. 1 is a block diagram that illustrates components of the application status system, in one embodiment. The application status system 100 includes an application interface 110, a user interface 130, an item manager 140, a display item component 150, a configuration component 160, a group manager 170, and a display group component 180. The application status system 100 interacts with one or more applications 195 to display the applications' status. Each of these components is described further herein.

The application interface 110 includes a receive icon component 115 and a notify application component 120. The application interface 110 handles interactions with the application 195 on behalf of the application status system 100. The receive icon component 115 provides an API that the application 915 calls to set and clear status icons for the application 195. For example, the receive icon component 115 may provide an API that the application 195 can call with an icon to set the icon as the current status icon and can call without an icon to clear the status icon currently associated with the application 195. The notify application component 120 notifies the application 195 of relevant events to which the application 195 may want to respond. For example, the notify application component 120 may notify the application 195 when the operating system shell starts or restarts, so that the application 195 can provide a status icon for the shell to display in the user interface 130.

The user interface 130 provides an interface for the user to switch between applications and view information about applications that are currently running. The user interface 130 may display a taskbar, start menu, system tray, and other operating system shell elements with which users and applications can interact. The user interface 130 may display a taskbar button for each running application as well as the status icons described herein in an overlay over the taskbar button.

The item manager component 140 manages each individual item that can be present in the user interface 130. For example, each application or application window may have a corresponding item that is associated with a taskbar button or other user interface element in the user interface 130. The item manager component 140 tracks which applications are associated with each element.

The display item component 150 manages data associated with an item and performs the steps for displaying an item. For example, the display item component 150 may store the overlay icon currently set for an application, the time the overlay icon was last set, and so on. The display item component 150 renders elements for display in the user interface 130, such as by alpha blending an application main icon and title with the status icon as an overlay on the main icon.

The configuration component 160 manages configuration of the application status system 100. For example, the user may be able to configure whether the user interface 130 groups application windows, and if so how many application windows the user interface 130 displays before the grouping occurs. The configuration component 160 may also allow status icons to be turned on or off, animation to be allowed or not, and other preferences to be set.

In some embodiments, the user interface component 130 groups user interface elements associated with the same application. For example, web browsers often display each web page that a user opens in a separate window where each window has an associated user interface element in the user interface 130. As another example, word processing programs often display each document that a user opens in a separate window. The application status system 100 includes a group manager 170 and a display group component 180 that manage the display of status icons for application groups. The group manager 170 keeps track of each application window the system can potentially group. For example, the group manager 170 may store a group class instance in memory that contains a pointer to each application item within the group. The display group component 180 manages displaying a status icon for the group. The display group component 180 may determine which of several application status icons to display for grouped application windows that have multiple status icons. For example, the display group component 180 may access the timestamp associated with each item and display the most recently set overlay icon as the status icon for the whole group. These and other behaviors of the application status system 100 are described further herein.

The computing device on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
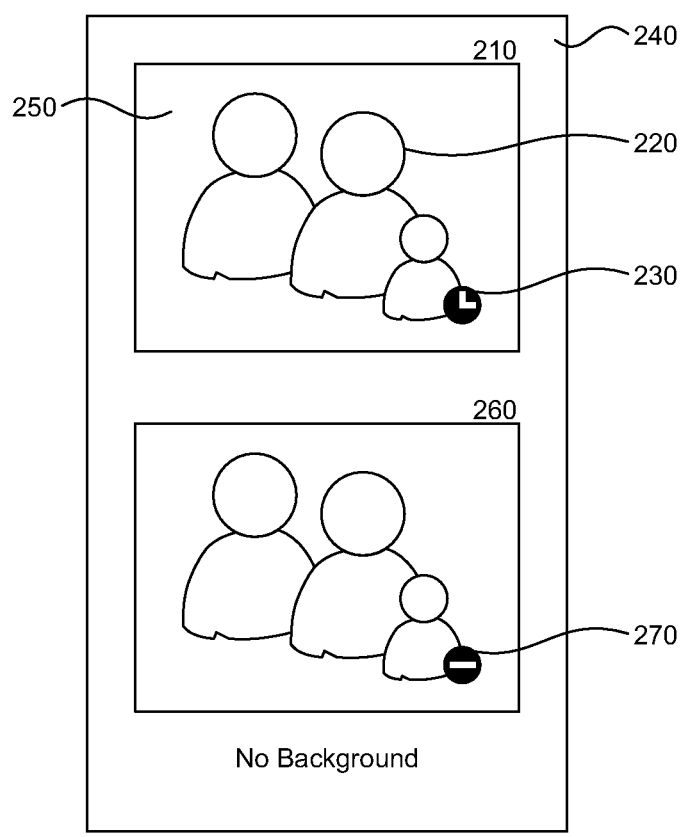
FIG. 2 is a display diagram that illustrates a status icon displayed by the application status system, in one embodiment.

FIG. 2 is a display diagram that illustrates a status icon displayed by the application status system, in one embodiment. The diagram contains two application icons, a first icon 210 and a second icon 260. The first icon 210 contains a main icon 220 and an overlay icon 230. The main icon 220 may represent a static icon associated with the application that the system displays in the taskbar or in association with the application window. The overlay icon 230 represents the status icon described herein, and the application can change the overlay icon 230 as the application's status changes. For example, in the first icon 210, the overlay icon 230 displays a user's "away" status for an instant messaging application, and in the second icon 260 the overlay icon 270 displays the user's "busy" status. The icons have a transparent background 250 that allows the background 240 over which they are placed to show through. Similarly, the overlay icon 230 has a transparent background so that it does not obscure the main icon 220.

Figure 3:
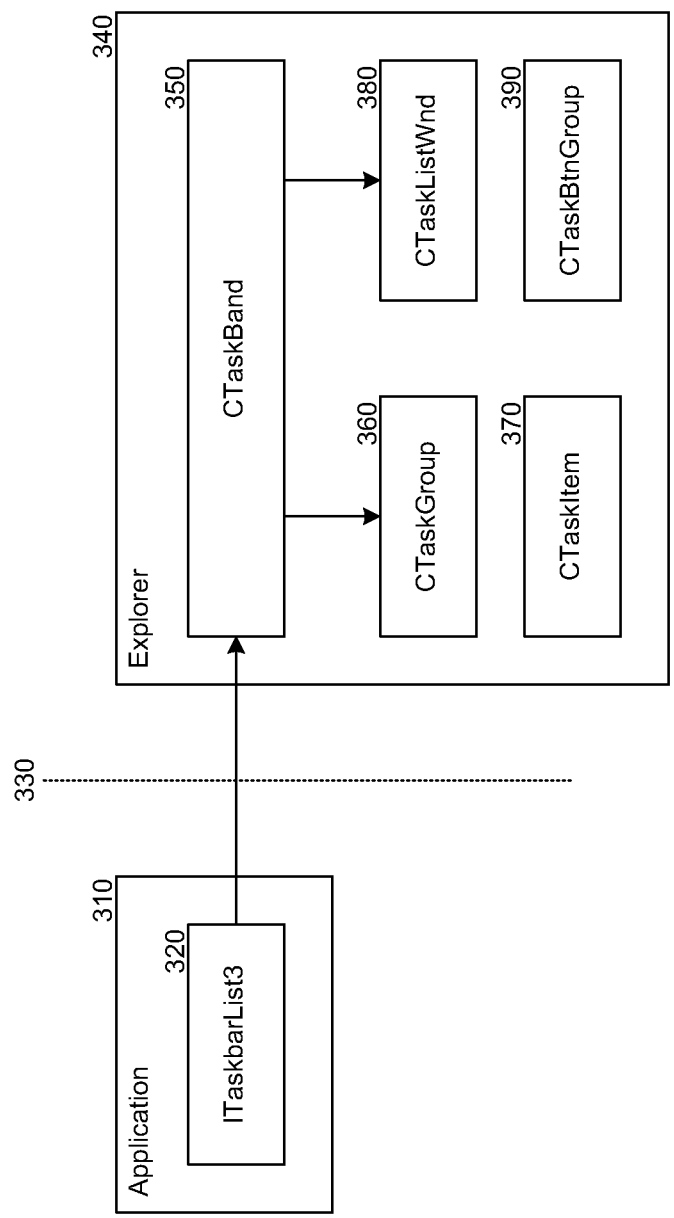
FIG. 3 is a block diagram that illustrates an operating environment of the application status system, in one embodiment.

FIG. 3 is a block diagram that illustrates an operating environment of the application status system, in one embodiment. The environment includes an application 310 and an operating system shell 340. For example, the Explorer.exe process displays the operating system shell 340 for Microsoft Windows, and displays user interface elements such as the user's desktop and a taskbar for switching between applications. The dashed line 330 between the application 310 and the operating system shell 340 represents a process or other boundary that separates the application 310 and the operating system shell 340. Those of ordinary skill in the art will recognize that applications may run in many configurations, including as a library within the process of the operating system shell 340, and the configuration shown is merely for illustration and not intended to limit the possible configurations of the system. The application status system provides the application 310 with an interface 320 for setting a status icon for the application. For example, the application may receive a pointer to the interface by instantiating a COM object, linking to an operating system library that provides an API for creating the interface, and so forth. Following is one example of receiving the pointer and calling the API:

```
HRESULT AddIconOverlay(HWND hwnd, HICON hicon)
{
    ITaskBarList3 *ptbl;
    HRESULT hr = CoCreateInstance(CLSID_TaskbarList, NULL,
        CLSCTX_INPROC_SERVER, IID_PPV_ARGS(&ptbl));
    if (SUCCEEDED(hr))
    {
        hr = ptbl->SetoverlayIcon(hwnd, hicon);
        ptbl->Release( );
    }
    return hr;
}
```

The operating system shell 340 includes classes for managing the display of the application-switching user interface. In the example illustrated, the operating system shell 340 includes an instance of a CTaskBand class 350, one or more instances of a CTaskGroup class 360, one or more instances of a CTaskItem class 370, an instance of a CTaskListWnd class 380, and one or more instances of a CTaskBtnGroup class 390. The CTaskBand class 350 manages the data and display of the application-switching user interface. For example, the CTaskBand class 350 may store information about a window associated with the application-switching user interface and pointers to each of the other class instances described. The CTaskGroup class 360 manages data associated with a particular application and each of its windows that the user interface represents with an element (e.g., a button) in the application-switching user interface. The CTaskItem class 370 manages data associated with a particular application window. For example, the CTaskItem class 370 may store the queue of icons for an application and the time when the system received each one.

A single application may display many windows, and the operating system shell 340 may group them together or show them individually. For example, Microsoft Internet Explorer may display a window for each web page that a user has open, and Microsoft Windows Explorer may display a taskbar button for each window or group the windows into a single taskbar button (e.g., when the count of windows exceeds a certain number). The CTaskListWnd class 380 manages a window for displaying the application-switching user interface. For example, in Microsoft Windows, the taskbar is a window (e.g., displayed at the bottom of the screen and on top of other applications), and applications are represented by buttons displayed within the window. The CTaskBtnGroup class 390 manages the rendering of the individual application or group elements within the application-switching user interface. The CTaskBtnGroup class 390 gathers information from the CTaskGroup class 360 and the CTaskItem class 370 to determine what to display. For example, for Microsoft Windows the CTaskBtnGroup class 390 manages the portion of the taskbar that contains application buttons (e.g., the area excluding the start menu and system tray).

Figure 4:
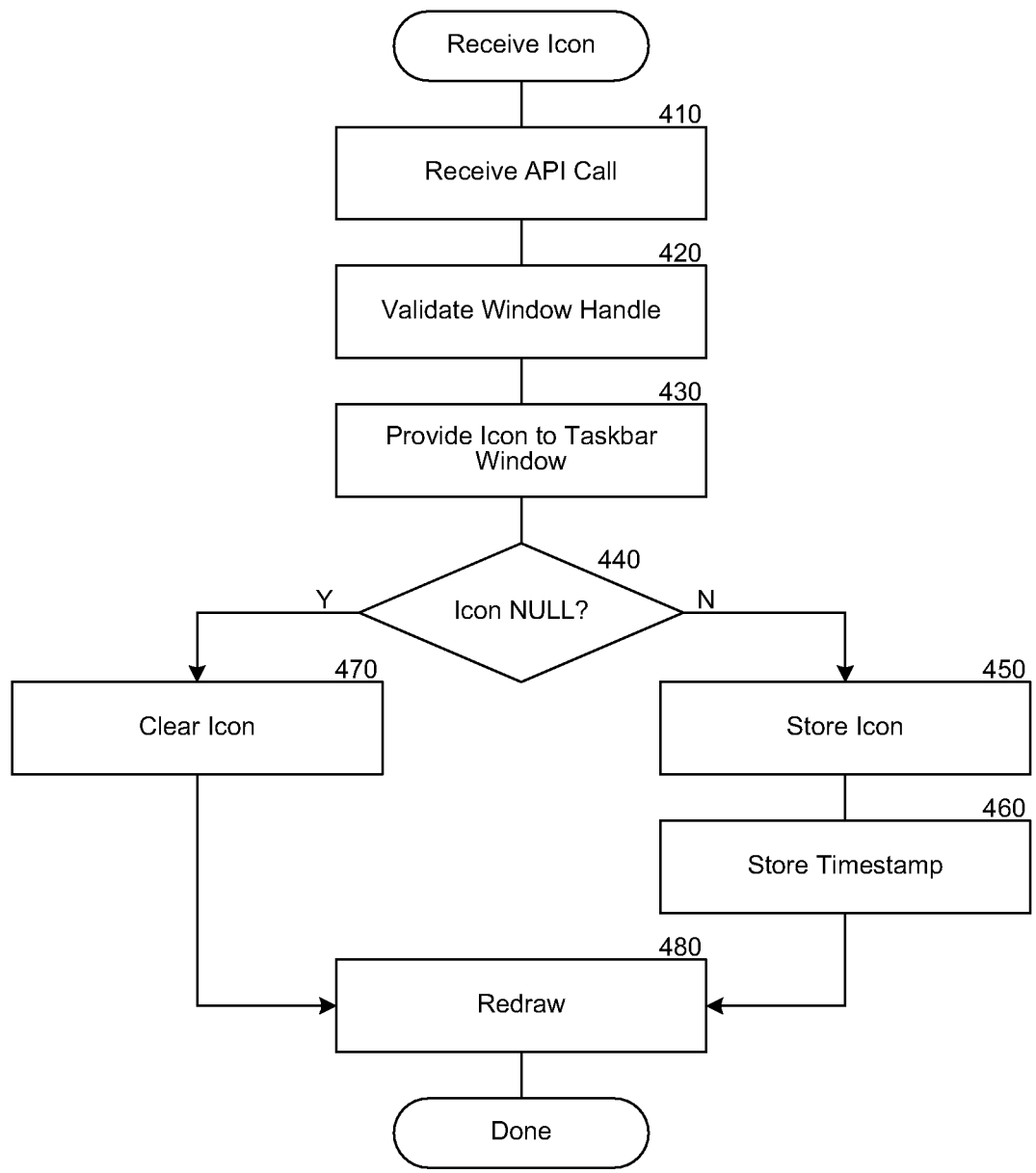
FIG. 4 is a flow diagram that illustrates the processing of the receive icon component of the application status system, in one embodiment.

FIG. 4 is a flow diagram that illustrates the processing of the receive icon component of the application status system, in one embodiment. These steps are invoked when an application calls the API associated with the application status system for updating the status icon (e.g., ITaskBarList3::SetOverlayIcon). In block 410, the system receives a call through the API that includes a window handle and icon handle. For example, an application may change status and call the API to update its associated status icon. In block 420, the system verifies the window handle passed to the API to verify that it belongs to the process of the caller. For example, the system may block attempts to set a status icon for another application.

In block 430, the system provides the status icon to the application-switching user interface window. For example, the system may call PostMessage( ) to send a TBC_SETOVERLAYICON message to the taskbar passing the HWND and HICON received from the caller. The taskbar receives this call through the message pump of the window associated with the CTaskListWnd class instance described herein. The CTaskListWnd class instance locates the CTaskItem corresponding to the window and calls CTaskItem::SetOverlayIcon( ). In decision block 440, if the received icon handle is NULL, then the system continues at block 470, else the system continues at block 450. In block 450, the application-switching user interface stores a copy of the icon. For example, CTaskItem::SetOverlayIcon( ) may make a copy of the icon handle and store it in a local variable.

In block 460, the component stores a timestamp of the current time when the application called the API as a basis for selecting status icons later on. In block 470, the component clears any currently stored status icon. In block 480, the component redraws the item. For example, the component may signal the user interface component to update the taskbar window. After block 480, these steps conclude.

Figure 5:
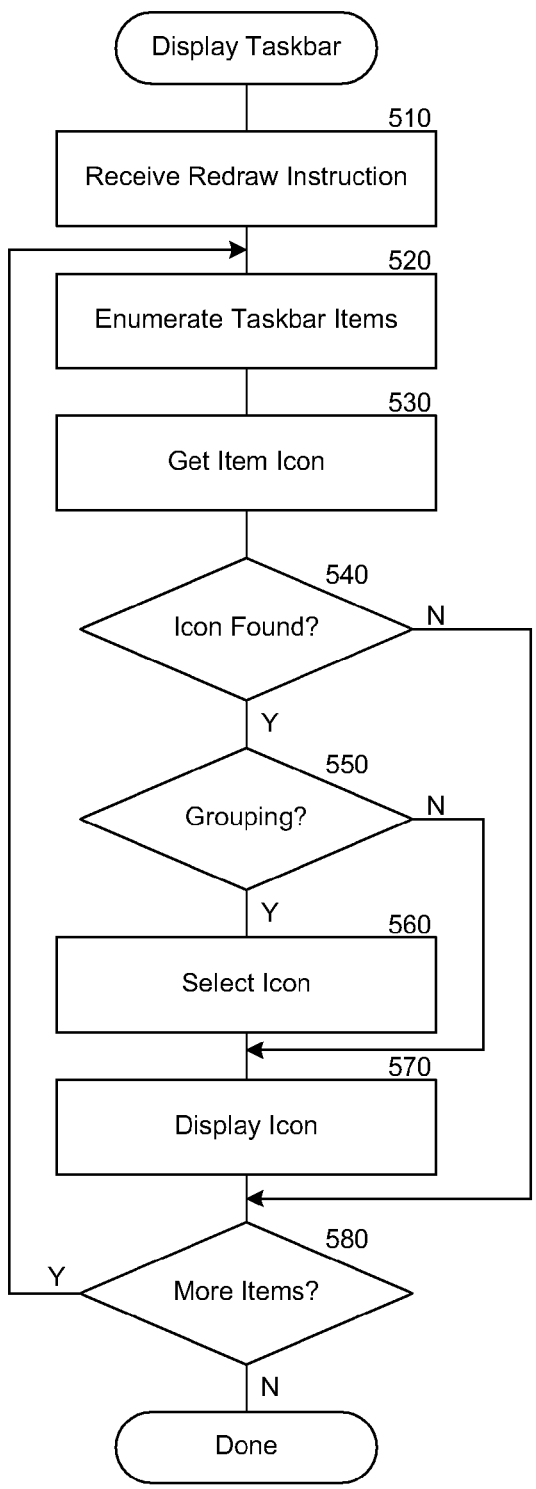
FIG. 5 is a flow diagram that illustrates the processing of the display item component of the application status system, in one embodiment.

FIG. 5 is a flow diagram that illustrates the processing of the display item component of the application status system, in one embodiment. The component is invoked when the system redraws all or a portion of the application-switching user interface. In block 510, the component receives an indication to redraw all or part of the taskbar. For example, when the user launches a new application or an application updates its status icon, the system may call the CTaskBtnGroup class instance described herein to redraw that application's associated taskbar buttons. In block 520, the component enumerates the application-switching user interface items associated with one or more applications. For example, when CTaskBtnGroup is rendering it may enumerate through each CTaskItem class instance. In block 530, the component retrieves the status icon for the current item. For example, CTaskBtnGroup may call CTaskItem::GetOverlayIcon( ) to determine if the item contains an associated overlay icon.

In decision block 540, if the component successfully retrieved the icon, then the component continues at block 550, else the component continues at block 580. In decision block 550, if the user has configured the application-switching user interface to group items from the same application, then the component continues at block 560, else the component continues at block 570. In block 560, the component selects an icon to display from each of the items associated with the application. For example, the component may call CTaskItem::GetOverlayIconTimestamp( ) to get the timestamp for each status icon and select the icon handle belonging to the CTaskItem instance with the highest timestamp for the component to display. If there is only one CTaskItem instance in the group with an overlay icon, then the system uses any icon associated with that instance. In block 570, the component displays the selected icon as an overlay on the associated taskbar item. For example, the component may paint the taskbar button and then paint the overlay icon on top of it, or alpha blend the taskbar button and overlay icon. In decision block 580, if there are more items, then the component loops to block 520 to process the next item, else the component completes. After block 580, these steps conclude.

In some embodiments, the application status system prevents applications not associated with a taskbar button from modifying the status icon associated with the taskbar button. For example, a malicious or erroneous application could try to modify another application's status icon. The system ignores calls to the overlay API that are not from a process associated with the taskbar button.

In some embodiments, the application status system automatically unloads status icons associated with terminated applications. For example, if an application terminates and fails to clear its status icon, then the system may unload the icon to save system resources.

In some embodiments, the application status system automatically selects a status icon when multiple windows or an application are grouped together on the taskbar. For example, Microsoft Windows can be set to group windows of the same application into one taskbar button when an application is displaying more than a set number of windows (e.g., four). Each of the application windows may expect to have its own taskbar button and may have set a status icon. The system may select one of the icons to display in association with a single group taskbar button displayed by the operating system. For example, the application status system may select the most recently set status icon, or the icon associated with the leftmost (e.g., earliest created) application window. If the application clears the selected icon, then the application status system may select another status icon displayed by another application window to display in association with the group button.

In some embodiments, the application status system queues status icons received from an application. The application pushes status icons to the system one at a time and the system stores each one in a queue. When the application has multiple windows that the system groups into a single taskbar button, the system displays the most recent status icon pushed to the system by the application. Applications can clear status icons at any time. When an application clears a status icon, the system displays the next most recent status icon. This allows applications to easily display a transient status and then revert to a long-term status by clearing the transient status.

In some embodiments, the application status system provides a message to applications to inform the applications that the operating system created the application-switching user interface. This can occur at system startup, when a new user logs on, when the operating system shell restarts, and so on. Applications may respond to the message by setting an initial status icon.

In some embodiments, the application status system displays special types of icons. For example, the application status system may receive an animated GIF icon from an application and display the icon animated in the application-switching user interface.

In some embodiments, the application status system throttles painting of the application-switching user interface to avoid degrading system performance. For example, the application status system may only refresh the application-switching user interface 30 times per second, since this is the highest amount that a typical user can perceive, even though an application may supply a status icon update more frequently.

In some embodiments, the application status system provides transitions between status icons as the application sets new status icons or the system displays other icons in the queue. For example, the system may provide a fade-out/fade-in effect when transitioning between icons, or animate the icon in some way (e.g., inflating the icon) to attract attention to it. If the system is not currently displaying an overlay for an application and receives a call to display an overlay, the system may fade in the overlay with a medium speed (e.g., 500-800 ms). If the system is currently displaying an overlay and receives a call to clear the overlay, the system may fade out the overlay with a medium speed (e.g., 500-800 ms).

In some embodiments, the application status system receives configuration information from a user that modifies the behavior of the system. For example, the system may allow the user to turn off the display of the status icon, such as if the user finds it annoying. As another example, the system may allow the user to specify which applications can display a status icon, how frequently the system updates the icon, and other configuration settings.

In some embodiments, the application status system makes the status icon clickable, so that an application can display a menu or other additional information about the application. Icons in the system tray today are clickable, and to encourage applications to use the taskbar overlay instead, the application status system may provide similar functionality through the status icon.

From the foregoing, it will be appreciated that specific embodiments of the application status system have been described herein for purposes of illustration, but that various modifications may be made without deviating from the spirit and scope of the invention. For example, the system can be used with many operating systems and status display user interface paradigms. As an example, the status icon could be displayed in place of the main application icon in the taskbar, on the application window, or in other locations. Accordingly, the invention is not limited except as by the appended claims.

We claim:

1. A computer-implemented method for displaying a status icon for an application having a group of two or more windows opened by the application, the method comprising:

providing a status overlay icon API that allows the application to provide the status icon that will be displayed by an operating system in an application-switching user interface window, wherein calling the API instructs the operating system to manage multiple status icons belonging to the group;

providing the application-switching user interface window, wherein the user interface window displays a user interface element for the group;

receiving a call to the API from the application, wherein the API call includes a window handle and a handle to the status icon which indicates a status of the application;

storing a timestamp of the current time when the API call was received and using the timestamp to determine that the status icon is the most recent one of the multiple status icons to display for the application;

providing the status icon to the application-switching user interface window;

storing a copy of the status icon in association with the application-switching user interface window; and displaying the status icon when the application-switching user interface window draws the user interface element associated with the application, wherein a display location of the status icon is selected to overlay an application taskbar interface already displayed for the application and without employing a separate area outside of the application's already displayed interface to which to direct the user for application status information.

2. The method of claim 1 further comprising verifying that the window handle received in the API call belongs to a process associated with the application.

3. The method of claim 1 further comprising, if the received icon handle is NULL, clearing a currently stored status icon.

4. The method of claim 1 further comprising determining that the application is no longer running and clearing the stored copy of the status icon.

5. The method of claim 1 wherein storing a copy comprises adding the status icon to a queue of status icons associated with the application.

6. The method of claim 1 wherein displaying the status icon comprises throttling a number of updates to the status icon to manage system performance.

7. The method of claim 1 wherein displaying the status icon comprises determining whether the application had a previously associated status icon, and if the application did not have a previously associated status icon fading in the received status icon.

8. The method of claim 1 further comprising receiving a notification that a user clicked on the status icon and displaying additional information about the application in response to the click.

9. A computer system for displaying application status in an application-switching user interface window, the system comprising:

a processor and memory configured to execute software instructions embodied within the following components:

a receive icon component configured to provide an API that applications call to set and clear status icons associated with the applications, wherein the API allows each of the applications to provide a status icon that will be displayed by an operating system in the application-switching user interface window, and wherein calling the API instructs the operating system to manage the status icons on behalf of the applications;

a user interface component configured to provide the application-switching user interface window for a user to switch between said applications and view information about said applications that are currently running, wherein the user interface window displays an item for each of said applications to which the user can switch;

an item manager component configured to manage each of said items displayed by the user interface and configured to store timestamps of current times when each of the API calls were received to set the status icon for each of the applications;

a group manager configured to keep track of groups of two or more application windows opened for each of said applications;

a display item component configured to manage data associated with each of said items and display each of said items, wherein the display item component overlays the status icon for each of said applications on said items over a static icon displayed for each of said applications, and wherein a display location of the status icon is selected to overlay an application taskbar interface already displayed for the application and without employing a separate area outside of the application's already displayed interface to which to direct the user for application status information; and a display group component configured to access, for said groups that comprise multiple status icons, said timestamps associated with each status icon and display the most recently set status icon as the status icon for the corresponding application having the group.

10. The system of claim 9 further comprising a configuration component configured to manage configuration of the system.

11. The system of claim 9 further comprising a notify application component configured to notify the applications of relevant events to which the applications may want to respond.

12. The system of claim 11 wherein the notify application component notifies applications when the user interface is created.

13. The system of claim 9 wherein the display item component displays a 16×16 icon over a corner of a main icon associated with at least one of the applications.

14. A computer-readable storage device encoded with instructions for controlling a computer system to display a taskbar that includes application status information, by a method comprising:

receiving an indication to redraw at least a portion of the taskbar;

enumerating one or more taskbar items associated with one or more corresponding running applications;

for each enumerated taskbar item, retrieving a status icon associated with the taskbar item, wherein the status icon is provided through an API that allows the corresponding application to provide the status icon that will be displayed by an operating system in an application-switching user interface window, and wherein calling the API instructs the operating system to manage status icons on behalf of the corresponding application;

determining whether the taskbar has been configured to group status icons belonging to a group of two or more windows opened by the corresponding application; and, if the taskbar has been configured to group status icons from the application, using timestamps of current times when API calls for providing status icons were received to select the most recent one of the status icons as the retrieved status icon to display from the item associated with the application; and displaying the retrieved status icon as an overlay on the taskbar item, wherein a display location of the status icon is selected to overlay an application taskbar interface already displayed for an application associated with the taskbar item and without employing a separate area outside of the application's already displayed interface to which to direct the user for application status information.

15. The device of claim 14 wherein the indication to redraw is received in response to an application updating its associated status icon.

16. The device of claim 14 wherein the taskbar includes a button for each of the applications and displaying the retrieved status icon comprises displaying the retrieved status icon over at least a portion of the button.

\* \* \* \* \*